Sept. 26, 1944.  J. D. FORBES  2,358,798
PARACHUTE
Filed March 30, 1942   4 Sheets-Sheet 1
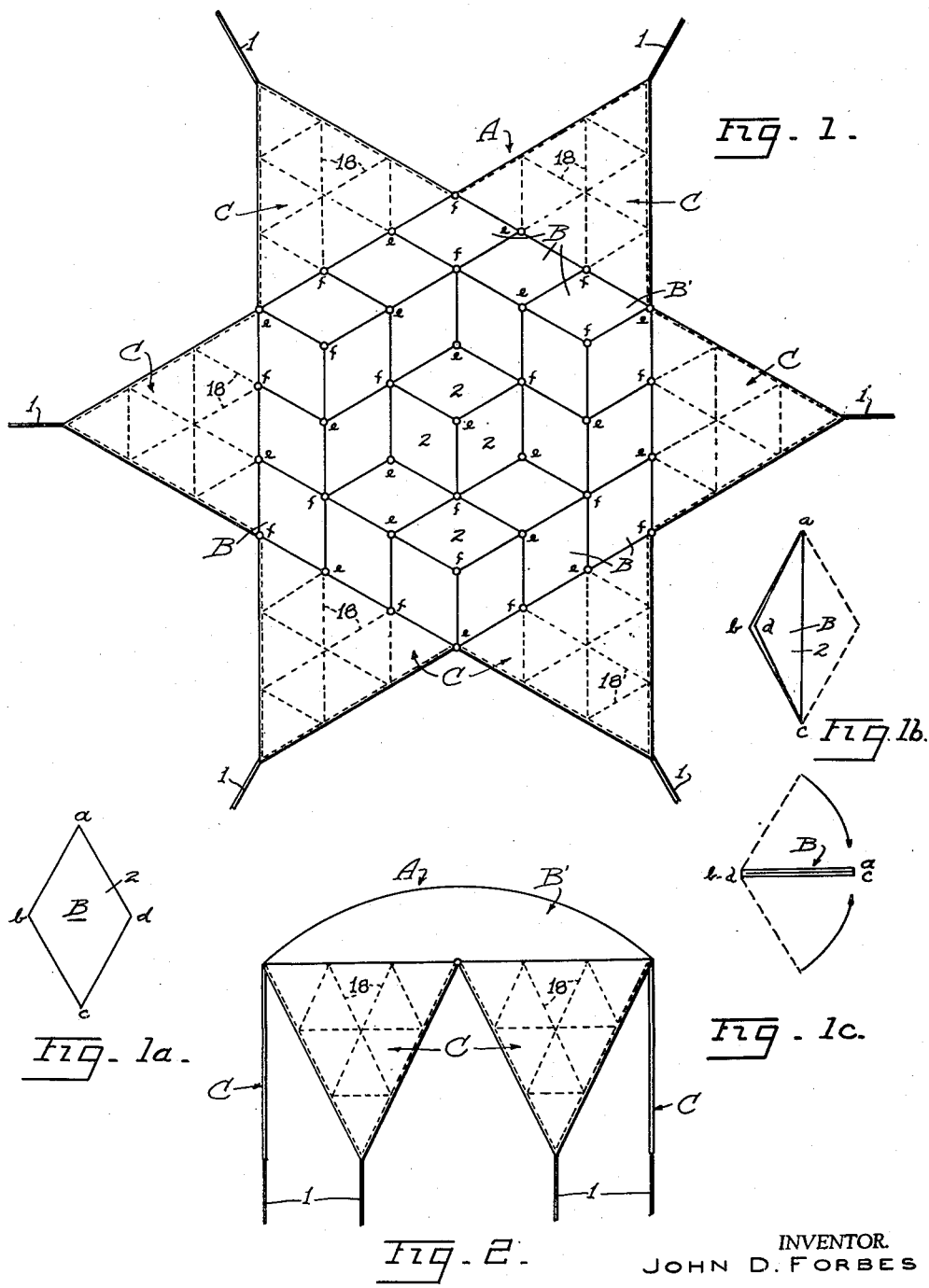
INVENTOR.
JOHN D. FORBES Sept. 26, 1944. J. D. FORBES 2,358,798
PARACHUTE
Filed March 30, 1942 4 Sheets-Sheet 3

INVENTOR.
JOHN D. FORBES
BY Munn, Liddy, Glaccum & Kane
ATTORNEYS

Sept. 26, 1944.　　J. D. FORBES　　2,358,798
PARACHUTE
Filed March 30, 1942　　4 Sheets-Sheet 4

INVENTOR.
JOHN D. FORBES
BY Munn, Liddy, Slaccum + Kane
ATTORNEYS

Patented Sept. 26, 1944

2,358,798

UNITED STATES PATENT OFFICE 2,358,798

PARACHUTE

John D. Forbes, San Francisco, Calif.

Application March 30, 1942, Serial No. 436,761

20 Claims. (Cl. 244—145)

My invention relates to improvements in a parachute, and it consists of the combinations, constructions and arrangements hereinafter described and claimed.

In the usual parachute, the pulling of the ripcord frees the parachute and the rush of air caused by the parachute being pulled rapidly through the air, opens it. An object of my invention is to provide a parachute that has means for forcing it into open position when freed. The flow of air need not be depended upon for blowing open the parachute. This enables the parachute to be used for shorter drops because it will open more quickly.

A further object of my invention is to provide a parachute which can be folded to a given length independent of the diameter of the parachute when open. It is this feature that permits parachutes of different sizes to be made and still the only change in size of the folded parachute is the diameter of the bundle. The length of the bundle will remain the same regardless of the diameter of the parachute when opened.

The parachute is made of a plurality of small units secured together. Such small units can be made of easily procured material, such as wood rods, cotton, linen or canvas. The usual parachute comprises one large sheet of material which is expensive to manufacture. The small units act as a guide for folding the parachute into a compact bundle.

The small individual units of the parachute are spaced a slight distance apart which allows part of the air to pass between the units. The sudden opening of the parachute will not suddenly reduce the speed of the falling object supported by the parachute. Instead the speed of descent is gradually reduced, not abrupt as with the regular parachute.

It is possible to increase the size of the parachute so that it will support heavy weights such as supplies, field guns, small tank parts or even torpedoes. If secured to an airplane and opened just at the time of landing, it would act as an emergency brake for bringing the airplane to a quick stop.

The device is simple in construction and is durable and efficient for the purpose intended.

Other objects and advantages will appear in the following specification, and the novel features of the device will be particularly pointed out in the appended claims.

My invention is illustrated in the accompanying drawings forming a part of this application, in which Figure 1 is a plan view of the parachute made in accordance with my invention;

Figures 1a, 1b, and 1c, are diagrammatic views illustrating how one of the parachute units is folded;

Figure 2 is a side elevation of the parachute shown in use;

Figure 4:
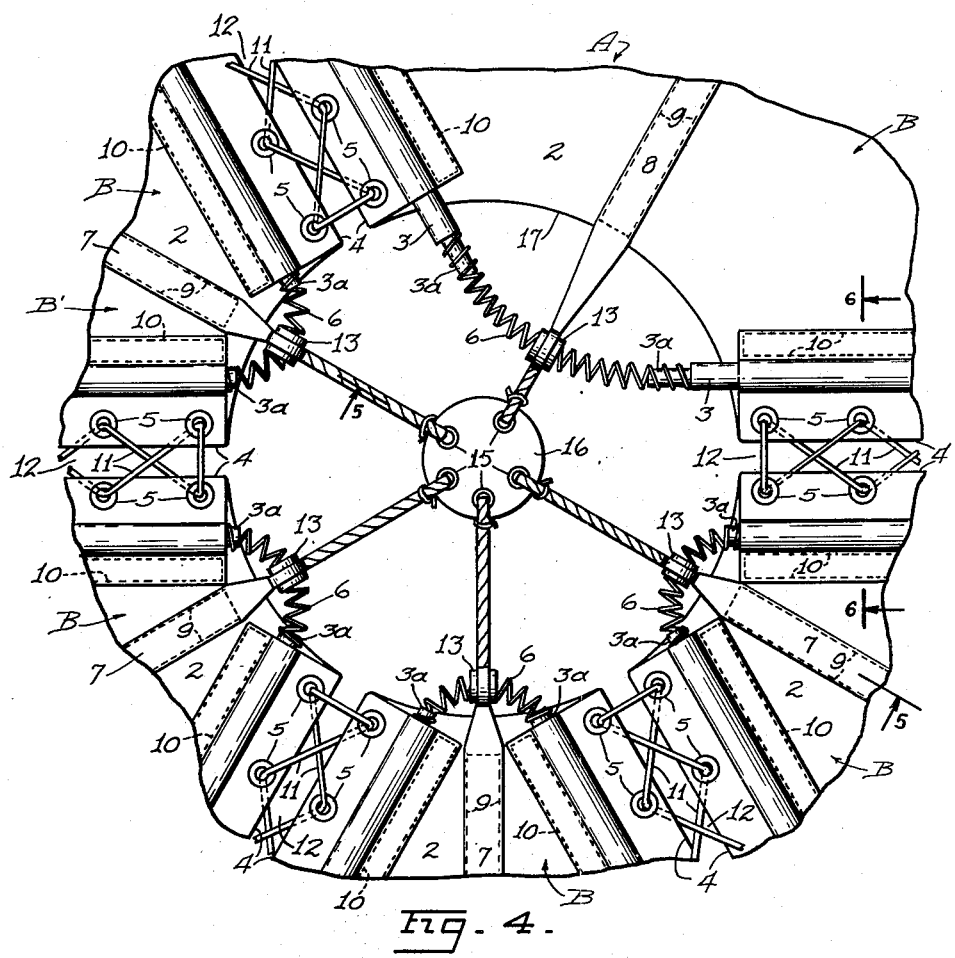
Figure 4 is a still larger scaled detail view of a portion of the parachute illustrating how a number of units are secured to a common point of attachment.
Figure 5:
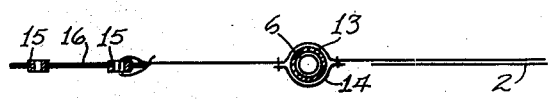
Figure 6:
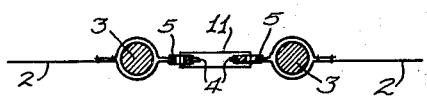
Figure 7:
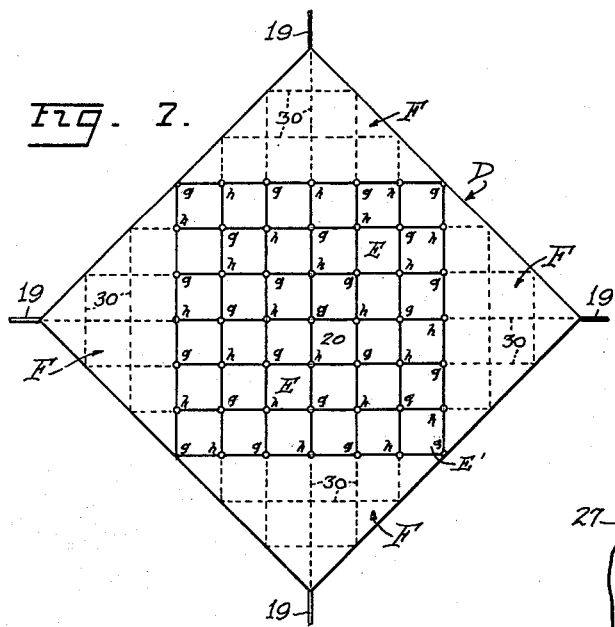
Figure 8:
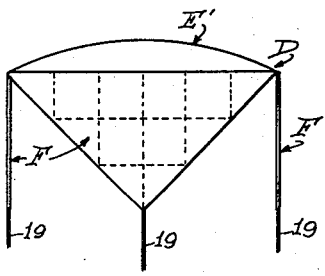
Figure 10:
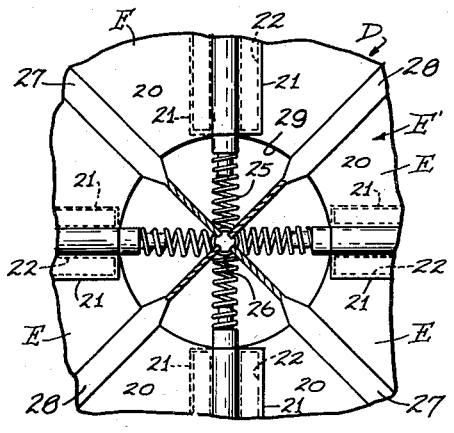
Figure 9:
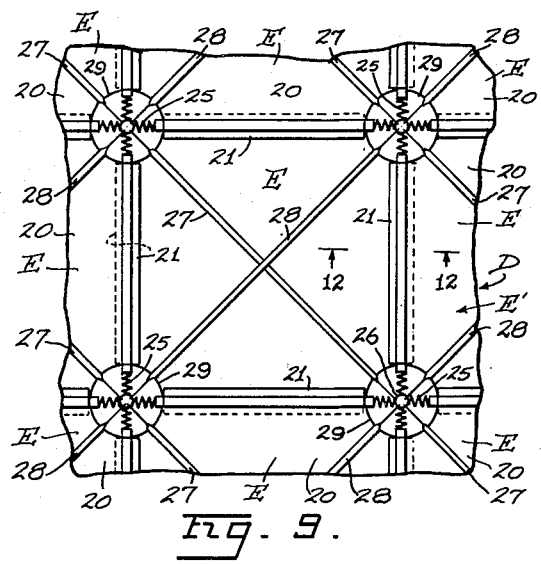
Figure 11:
Figure 12:
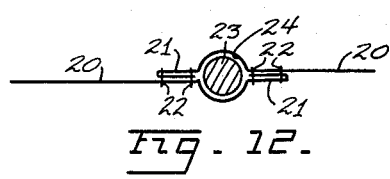

Figures 5 and 6 are sections taken along the section lines 5—5 and 6—6 of Figure 4;

Figure 7 is plan view of a slightly modified form of parachute;

Figure 8 is a side elevation of the modified form of parachute shown in use;

Figure 9 is an enlarged view of a portion of the modified form of parachute;

Figure 10 illustrates the manner of attaching the units of the modified parachute to a common center;

Figure 11 is a side elevation of a coil spring illustrating its particular shape; and Figure 12 is a section taken along the line 12—12 of Figure 9.

While I have shown the preferred forms of my invention, it should be understood that various changes or modifications may be made within the scope of the appended claims without departing from the spirit of the invention.

In carrying out my invention, I provide a parachute indicated generally at A in Figure 1 which is composed of a plurality of units B forming the body B' of the device, and side members C which encircle the device and have cords 1 secured thereto. Figure 2 illustrates the parachute in use with the body B' in the shape of a dome and the side members C depending from the body. The cords 1 hang from the side members and support the object, not shown.

Figure 3:
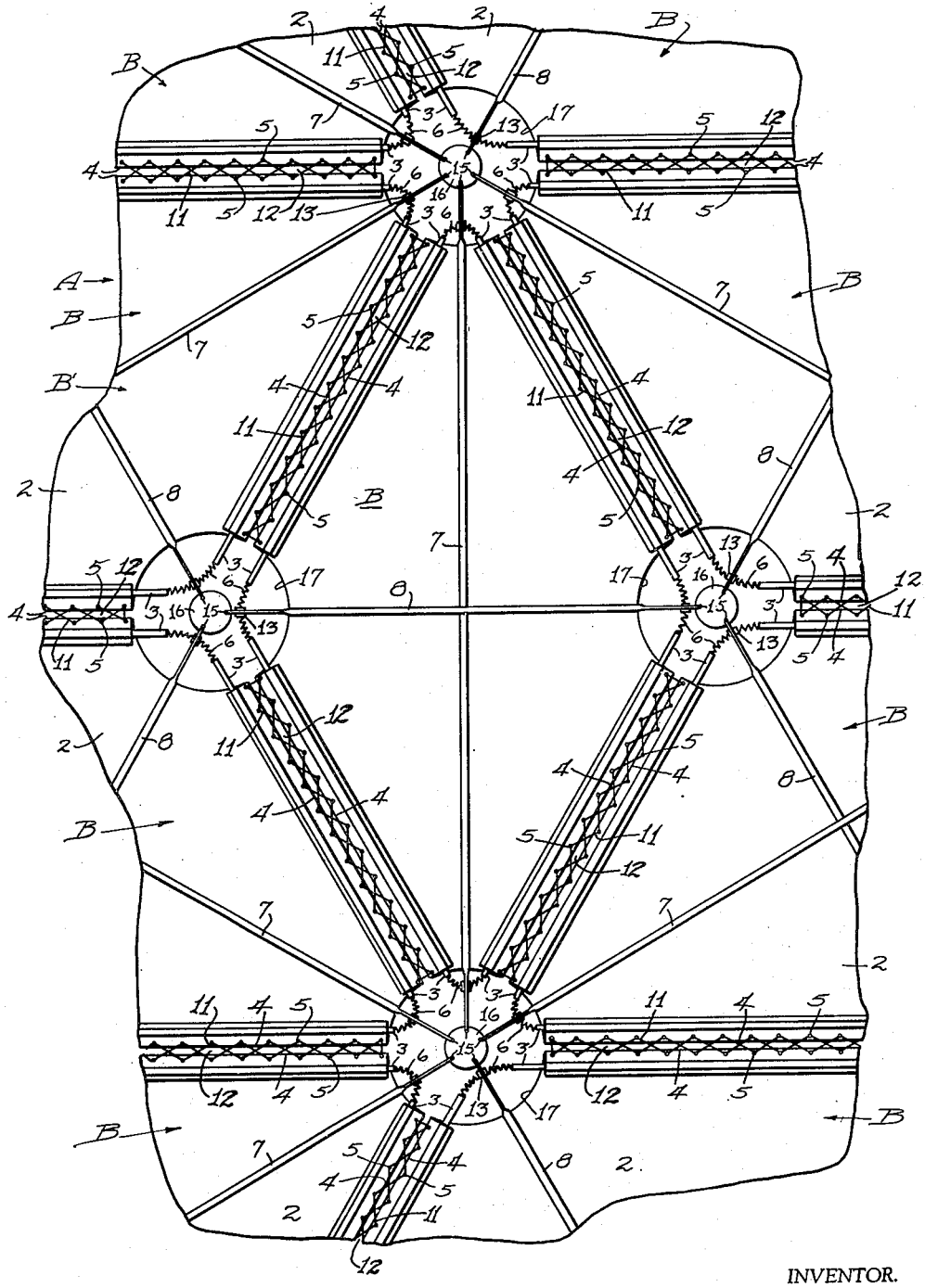
Figure 3 is an enlarged detailed showing of a portion of the parachute.

The units B are diamond-shaped and are interconnected in a definite manner. In Figure 3, one of the units B is shown in detail and is shown connected to the other adjacent units. A description of one unit will suffice for all and corresponding parts will be given like reference numerals. Each unit B comprises a piece of cloth 2 that is cut in the shape of a diamond or lozenge. The four edges of the cloth are folded back on themselves, see Figure 6, and receive rods 3 that are spaced inwardly from the folded edges 4 a distance sufficient for the folded portion to receive eyelets 5, see also Figure 4. The adjacent ends of the rods are interconnected by coil springs 6. Figure 4 illustrates how the rods 3 have reduced end portions 3a for receiving the ends of the coil springs.

Each piece of cloth 2 may be reinforced by tapes 7 and 8 that extend across the cloth from opposite corners, the tapes being at right angles to each other. Figure 4 shows how the tapes are stitched to the cloth at 9, with the ends of the tape projecting beyond the corners of the cloth for a purpose presently to be described. Figures 4 and 6 illustrate how the folded back cloth edges are stitched to the main body of the cloth 2 by stitching 10. The tapes 7 and 8 extend along the diagonals of the cloth unit 2 to prevent the cloth from stretching beyond the diamond or lozenge shape illustrated. The tapes take the place of the usual cordage now provided in parachutes. The pieces of cloth 2 forming the units B have angles of 30° and 120° although I do not wish to be confined to this exact shape.

I will now describe how the units B are connected to each other. The eyelets in the cloth folds along the edges of the units receive lacing 11 which adjustably connects the units together and provides slots 12 between adjacent units for the passage of air therebetween. The eyelets, lacing, and air slots are clearly shown in Figure 4. The edges of the units are not only connected, but tapes 7 and 8 are used for the purpose of connecting the units to common centers. Again referring to Figure 4, it will be noted that rings 13 are mounted at the midpoints of the springs 6. Figure 5 illustrates how the tape 7 is secured to the ring by a strap 14 and then how the end of the tape is passed through an eyelet 15 in a leather washer 16, the end of the tape being tied to itself after being passed through the eyelet. The portion of the tape lying between the ring and the washer is twisted to reduce its width.

The free ends of the tapes 8 are secured to rings 13 and washers 16 in the same manner. The diameter of the washer is much smaller than the diameter of the opening 17 formed by the converging corners of adjacent units B. The springs 6 extend into this opening. The opening permits air to pass therethrough in the same manner as the slots 12. The washers 16 constitute the intersections for the units B arranged around the particular washer. If desired, an additional system of cords, not shown, can be run through the lacing and across the cloth portions 2 of other units B.

The units B are arranged in a predetermined manner as shown in Figure 1. A group of three units form the center of the parachute. Around these three units I dispose a concentric circle of nine additional units. Then around the circle of nine units, I dispose an outer circle of fifteen units. The outer circle of units have the triangular-shaped side members C. These are large pieces of cloth reinforced with tapes 18 that form triangle areas. The triangle areas are not bounded by rods 3 as are the units B, but they may be folded in a manner similar to the folding of the units B which will shortly be described.

From the foregoing description of the various parts of the device, the operation thereof may be readily understood. The parachute is folded into a bundle in a particular manner. It is best first to refer to how one unit B can be folded and then describe how all of the units B making up the parachute can be simultaneously folded. In Figures 1a, 1b and 1c, I show diagrammatically how a unit can be folded. The unit B in Figure 1a, is in full open position. The rods and other details of construction are not shown. It can be assumed that the four sides of the unit have rigid rods secured thereto and that the ends of the rods are connected by the coil springs 6.

The first folding operation of the unit consists of moving the corner d over on top of corner b, see Figure 1b. Then the corners a and c are swung toward each other as indicated by the arrows in Figure 1c. These two folding operations bring the four rods 6 into parallel arrangement. The projecting triangular portion of the cloth may now be folded up against the rods. If the rods 6 are one fourth of an inch in diameter and are two feet long, the size of the bundle when folded would be one and one fourth inches in diameter and about two feet four inches in length. The unit B folds into a compact bundle. As soon as the unit is released, the springs 6 will instantly move it into its open position as shown in Figure 1a.

The parachute consists of three concentric rows of these units B. Each row has its perimeter in the shape of a hexagon. If rods of two feet in length are used, the outer diameter of the complete parachute will be thirteen feet and the entire parachute can be folded into a bundle about ten inches in diameter and two feet four inches in length. This includes the triangular side members C which give a star pointed effect to the parachute. Before describing how the parachute can be folded, it might be well to state that a dome-shaped appearance can be given to the body B' if the lacing 11 is such as to vary the widths of the slots 12. When the parachute fills with air during use, the hexagonal body B' will assume a dome-shaped appearance. The side members will depend from the periphery of the dome to take the place of the usual suspension arrangement for supporting the load. The side members C prevent the side tilting of the main body B'.

When a series of units B of the type shown in Figure 1a, are connected together to form a set of concentric hexagons, the entire device may be folded if all of the points of intersection designated by e are raised with respect to all of the points designated by f. It will be noted that the e points alternate with the f points. At the same time as the e points are being simultaneously raised above the plane occupied by the f points, they are moved inwardly toward a common center. Since the points e and f are in reality connected together by the rods 6, the upward and inward movement of the points e will cause the points f to also move inwardly, but in the same plane they already occupy. This inward movement of both the points e toward each other and the points f toward each other is continued until all of the frame bars or rods 6 are parallel to each other and at right angles to the plane they formerly occupied. This automatically folds each separate unit B in the same manner as that described for the unit shown in Figures 1a, 1b and 1c. The entire parachute by this simple arrangement is folded into a compact bundle.

The parachute may be quickly and readily opened. A mere freeing of the bundle will permit the springs 6 to move the rods 3 instantly into a common plane. The coiled corner springs 6 will tend to flatten each unit B separately and the combined units simultaneously. The parachute when opened and in use will allow part of the air current to pass through the slots 12 and the openings 17. The tapes 7 and 8 prevent the cloths 2 from stretching beyond a predetermined shape and they also take the place of the reinforcing cordage provided in the usual parachute. Instead of the coiled spring 6 being mounted on the reduced end of the rod 2, it is possible to insert a ferrule, not shown, into the spring end and solder the spring to the ferrule. The ferrule may be moved onto the reduced end of the rod and secured in place by a pin, not shown, that extends transversely through the rod and ferrule.

A simpler form of the parachute is disclosed in Figures 7 to 12 inclusive. The parachute indicated generally at D is formed from square framed units E. The side members F extend from the body portion E' and support cords 19 which in turn carry the load, not shown. Figure 8 illustrates how the body E' can be formed into a dome by the air and further shows the side members F depending from the dome and carrying the cords 19.

One of the square units E is set forth in detail in Figure 9. Here the edges of the cloth 20 are hemmed at 21, see Figure 12, and are stitched at 22 to the cloth of the adjacent unit. A rod 23 is received in a pocket 24 formed between the two hems. The ends of the rods are connected by springs 25. Figure 11, illustrates one of the springs. At the midpoint of the spring, the coil 26 is bent so that its plane will coincide with the longitudinal axis of the spring. Figure 10 shows two springs 25 crossing each other with their coils 26 superimposed one above the other.

Tapes 27 and 28 extend diagonally across the cloth 20 and their ends are twisted and then tied to the coils 26. In this way the parts are secured together. Openings 29 are provided at each corner where the units E are interconnected. Air can pass through these openings when the parachute descends with its load.

The parachute D can be folded in much the same manner as the parachute A. The intersecting points g are raised and moved toward each other while the intersecting points h will also move toward each other, but will remain in the same plane. This movement will bring the rods 23 into parallel relation. The side members F can also be folded into the same bundle. The tapes 30 in the side members take the place of the rods, yet the squares defined by the tapes can be folded in the same manner as the framed squares.

The parachute D will be instantly opened by the springs 25 as soon as the bundle is freed. An immediate full opening results without the necessity of using the flow of air to effect the opening. Either parachute A or D may be altered in size by changing the number of concentric rings formed from units. Regardless of size, the length of the folded parachute will always be the same because the rods 3 or 23 are all of the same length.

I claim:

1. A parachute comprising a body formed from a plurality of units connected together, each unit consisting of a piece of cloth bounded by rods of equal length, said units forming concentric rows, the parachute being folded into a compact form when the rods are arranged in parallel relation.

2. A parachute comprising a body formed from a plurality of units connected together, each unit consisting of a piece of cloth bounded by rods, said rods being movable into parallel relation for folding the parachute into a compact bundle, and springs interconnecting certain of the rods for urging them into full open position when the bundle is freed.

3. A parachute comprising a body formed from a plurality of units arranged in concentric rows, and means securing the units together, said means providing spaces between all sides of adjacent units for allowing part of the air to pass therethrough when the parachute is open, whereby the speed of descent of the parachute is gradually reduced rather than abruptly.

4. A parachute comprising a body formed from a plurality of units connected together and arranged in concentric rows, each unit consisting of a piece of cloth bounded by rods of equal length on four sides, means pivotally securing the rods together, certain of said pivot means being raised above the others when it is desired to fold the parachute, this upward movement of certain of the pivot means moving the rods into parallel relation for folding the parachute into a compact form in which the length of the rods determines the length of the folded bundle.

5. A self-opening parachute comprising a body formed from a plurality of units connected together in concentric rows, each unit consisting of a piece of cloth bounded by four rods of equal length, springs connecting the rods together for causing the rods to open up into a flat plane when the rods are freed, said rods being movable into parallel relation for folding the parachute into a compact bundle, said bundle when freed permitting all of the springs to open their units, whereby the parachute is instantly opened.

6. A parachute comprising a body formed from a plurality of units connected together and arranged in concentric rows, each unit consisting of a piece of cloth bounded by rods, and side members secured to the periphery of the body and supporting load-carrying cords.

7. In a parachute composed of a plurality of units arranged in concentric rows, each unit comprising a cloth bounded by four rods of equal length, springs connecting the ends of the rods together for stretching the cloth into a flat plane, and tapes extending diagonally across the cloth for holding it in proper shape.

8. In a parachute, a body composed of a plurality of units, each unit comprising a cloth bounded by rods, coil springs connecting the rod ends together for yieldingly holding the cloth in a flat plane, the adjacent units having their proximate edges disposed a slight distance apart, and lacing connecting the proximate edges.

9. In a parachute, a body composed of a plurality of units, each unit comprising a cloth bounded by rods, coil springs connecting the rod ends together for yieldingly holding the cloth in a flat plane, the adjacent units having their proximate edges disposed a slight distance apart, lacing connecting the proximate edges, and tapes extending diagonally across the cloth and being secured thereto, rings mounted on the springs, the ends of the tapes extending beyond the cloth being secured to the rings, and fastening members disposed at the corners of the units and having the tape ends secured thereto.

10. In a parachute, a body composed of a plurality of diamond-shaped units, each unit comprising a diamond-shaped cloth, rods bounding the four edges of the cloth and being spaced inwardly a slight distance to provide for a row of eyelets, lacing securing the proximate edges of adjacent units together with sufficient space to provide slots between the units, springs connecting the rod ends of each unit together and adapted to open the cloth in each unit into a flat plane, tapes extending diagonally across the units and being secured thereto, and fastening means disposed at the corners of the units for having the ends of the tapes secured thereto.

11. In a parachute, a body composed of a plurality of diamond-shaped units, each unit comprising a diamond-shaped cloth, rods bounding the four edges of the cloth and being spaced inwardly a slight distance to provide for a row of eyelets, lacing securing the proximate edges of adjacent units together with sufficient space to provide slots between the units, springs connecting the rod ends of each unit together and adapted to open the cloth in each unit into a flat plane, tapes extending diagonally across the units and being secured thereto, fastening means disposed at the corners of the units for having the ends of the tapes secured thereto, and rings slidable on the springs and having the tapes secured thereto.

12. A parachute comprising a body composed of a plurality of square-shaped units, each unit consisting of a piece of cloth bounded by four rods of equal length, the adjacent units having only one rod disposed between coinciding edges, springs securing the ends of aligned rods together and crossing each other at the corners of the units, and tapes extending diagonally across the cloth of each unit and having their free ends secured to the points of the intersections of the springs.

13. A parachute comprising a body formed from a plurality of units connected together each unit consisting of a piece of cloth bounded by rods of equal length, said units forming concentric rows, the parachute being folded into a compact form when the rods are arranged in parallel relation, triangularly-shaped side members secured to the periphery of the body, and cords supported by the side members.

14. A parachute comprising a body formed from a plurality of units connected together, each unit consisting of a piece of cloth bounded by rods of equal length, said units forming concentric rows, the parachute being folded into a compact form when the rods are arranged in parallel relation, triangularly-shaped side members, each having one entire edge secured to the periphery of the body so that their apices are spaced from each other and from the body when the parachute is open, and cords secured to the apices of the side members.

15. A parachute comprising a body formed from a plurality of units connected together, each unit consisting of a piece of cloth bounded by rods, said rods being movable into parallel relation for folding the parachute into a compact bundle, springs interconnecting certain of the rods for urging them into full open position when the bundle is freed, triangularly-shaped side members secured to the periphery of the body, and cords supported by the side members.

16. A parachute comprising a body formed from a plurality of units connected together, each unit consisting of a piece of cloth bounded by rods, said rods being movable into parallel relation for folding the parachute into a compact bundle, springs interconnecting certain of the rods for urging them into full open position when the bundle is freed, triangularly-shaped side members, each having one entire edge secured to the periphery of the body so that their apices are spaced from each other and form the body when the parachute is open, and cords secured to the apices of the side members.

17. A parachute comprising a body formed from a plurality of units, arranged in concentric rows, means securing the units together, said means providing spaces between all sides of adjacent units for allowing part of the air to pass therethrough when the parachute is open, whereby the speed of descent of the parachute is gradually reduced rather than abruptly, triangularly-shaped side members secured to the periphery of the body, and cords supported by the side members.

18. A parachute comprising a body formed from a plurality of units, arranged in concentric rows means securing the units together, said means providing spaces between all sides of adjacent units for allowing part of the air to pass therethrough when the parachute is open, whereby the speed of descent of the parachute is gradually reduced rather than abruptly, triangularly-shaped side members, each having one entire edge secured to the periphery of the body so that their apices are spaced from each other and from the body when the parachute is open, and cords secured to the apices of the side members.

19. A parachute comprising a body formed from a plurality of square-shaped units connected together, each unit consisting of a piece of cloth bounded by four rods of equal length, said units forming concentric rows so that the outer edge of the body is square, four triangularly-shaped side members, each having one entire edge equal in length to the outer edge of the body and being secured thereto, the parachute being folded into a compact form when the rods are arranged in parallel relationship.

20. A parachute comprising a body composed of a plurality of square-shaped units, each unit consisting of a piece of cloth bounded by four rods of equal length, the adjacent units having only one rod disposed between coinciding edges, springs securing the ends of the aligned rods together, said springs having ring-shaped portions formed at their midpoints, whereby the ring-shaped portions of every two intersecting springs will coincide with each other, and tapes extending diagonally across the cloth of each unit and having their free ends secured to the coinciding ring-shaped portions.

JOHN D. FORBES.